(12) United States Patent
Yamauchi et al.

(10) Patent No.: US 10,632,677 B2
(45) Date of Patent: Apr. 28, 2020

(54) APPARATUS FOR MANUFACTURING THREE-DIMENSIONAL SHAPED OBJECT

(71) Applicant: PANASONIC INTELLECTUAL PROPERTY MANAGEMENT CO., LTD., Osaka (JP)

(72) Inventors: Kousuke Yamauchi, Aichi (JP); Masataka Takenami, Aichi (JP); Syuu Ukegawa, Aichi (JP)

(73) Assignee: PANASONIC INTELLECTUAL PROPERTY MANGAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/083,793

(22) PCT Filed: Feb. 15, 2017

(86) PCT No.: PCT/JP2017/005489
§ 371 (c)(1),
(2) Date: Sep. 10, 2018

(87) PCT Pub. No.: WO2017/154489
PCT Pub. Date: Sep. 14, 2017

(65) Prior Publication Data
US 2019/0070781 A1  Mar. 7, 2019

(30) Foreign Application Priority Data

Mar. 11, 2016  (JP) ................. 2016-047713

(51) Int. Cl.
*B29C 64/371* (2017.01)
*B33Y 30/00* (2015.01)
(Continued)

(52) U.S. Cl.
CPC .......... *B29C 64/371* (2017.08); *B22F 3/1055* (2013.01); *B29C 64/153* (2017.08);
(Continued)

(58) Field of Classification Search
CPC .... B29C 64/371; B29C 64/264; B29C 64/364
See application file for complete search history.

(56) References Cited

U.S. PATENT DOCUMENTS

| 5,876,767 A | 3/1999 | Mattes et al. |
| 8,895,893 B2 | 11/2014 | Perret et al. |

(Continued)

FOREIGN PATENT DOCUMENTS

| JP | 9-511693 | 11/1997 |
| JP | 2000-260730 | 9/2000 |

(Continued)

OTHER PUBLICATIONS

Extended European Search Report issued in European Patent Office (EPO) Patent Application No. 17762832.8, dated Jan. 21, 2019.
(Continued)

*Primary Examiner* — Timothy Kennedy
(74) *Attorney, Agent, or Firm* — Greenblum & Bernstein, P.L.C.

(57) ABSTRACT

Apparatus for manufacturing a three-dimensional shaped object comprises a chamber, a transmission window, a blow-out port and a cover member, wherein a solidified layer is formed by irradiation of a predetermined portion of a material layer with a light beam, thereby allowing a sintering of the material in the predetermined portion or a melting and subsequent solidification of the material, the material layer being provided within the chamber. The transmission window is provided in the chamber, allowing the light beam to be transmitted there through. The blow-out port is located around the transmission window, and serves for blowing out an inert gas toward an interior of the chamber. The cover member, which is positioned below the blow-out port and also serves for surrounding the blow-out port, has an annular
(Continued)

form. A gap through which the inert gas-passes is provided between the cover member and the transmission window.

2 Claims, 7 Drawing Sheets

(51) Int. Cl.
*B22F 3/105* (2006.01)
*B29C 64/364* (2017.01)
*B29C 64/264* (2017.01)
*B33Y 10/00* (2015.01)
*B29C 64/153* (2017.01)
*B29C 64/268* (2017.01)

(52) U.S. Cl.
CPC .......... *B29C 64/264* (2017.08); *B29C 64/268* (2017.08); *B29C 64/364* (2017.08); *B33Y 10/00* (2014.12); *B33Y 30/00* (2014.12); *B22F 2003/1056* (2013.01); *B22F 2003/1059* (2013.01); *B22F 2201/10* (2013.01); *B22F 2999/00* (2013.01)

(56) References Cited

U.S. PATENT DOCUMENTS

2009/0266803 A1 10/2009 Perret et al.
2015/0367574 A1 12/2015 Araie et al.

FOREIGN PATENT DOCUMENTS

JP 2008-542550 11/2008
JP 2012-224919 11/2012

OTHER PUBLICATIONS

Official Communication issued in International Bureau of WIPO Patent Application No. PCT/JP2017/005489, dated May 9, 2017.
International Preliminary Report on Patentability for PCT/JP2017/005489, dated Sep. 11, 2018, with English language translation.

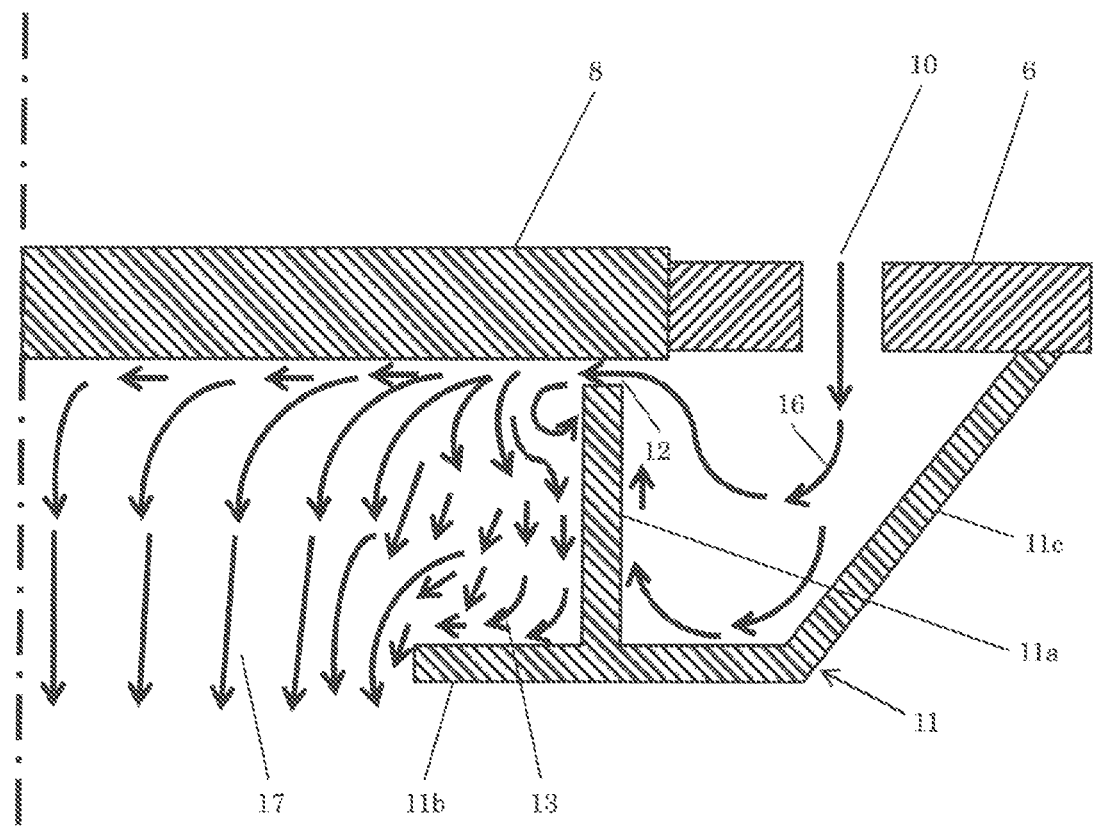

APPARATUS FOR MANUFACTURING THREE-DIMENSIONAL SHAPED OBJECT

TECHNICAL FIELD

The present invention relates to an apparatus for manufacturing a three-dimensional shaped object. More particularly, the present invention relates to a manufacturing apparatus of a three-dimensional shaped object wherein a repeated formation of a solidified layer is performed by an irradiation of a predetermined portion of a material layer with a light beam, and thereby producing the three-dimensional shaped object with a plurality of the solidified layers integrally stacked therein.

BACKGROUND OF THE INVENTION

An apparatus for manufacturing the three-dimensional shaped object is called a "3D-Printer" With such manufacturing apparatus, a powder material such as inorganic powder (e.g., metal powder) and organic powder (e.g., resin powder) is irradiated with a directional light beam (e.g., laser beam) having a desired energy. The irradiation of the powder material with the light beam allows a sintering of the material or a melting and subsequent solidification of the material, and thereby forming a solidified layer. The formations of the solidified layers eventually leads to a provision of the three-dimensional shaped object with a plurality of the solidified layers being stacked with each other. See "PATENT DOCUMENT 1" listed below, for example.

With reference to FIGS. 6 and 7, a manufacturing method of the three-dimensional shaped object by the manufacturing apparatus will be described. The three-dimensional shaped object may be referred to simply as "shaped object" in the following description.

As shown in FIG. 6, the manufacturing apparatus performs a forming of a solidified layer 102 by irradiating a powder layer 101 made of powder material with a laser beam L, and thereby allowing a sintering of the powder material or a melting and subsequent solidification of the powder material. Subsequently, the manufacturing apparatus performs a forming of a new solidified layer 102 by newly forming a powder layer 101 on the resultant solidified layer 102, followed by similar irradiation of the new powder layer with the laser beam L. The repetition of the forming of the solidified layer makes it possible for the solidified layers 102 to be stacked with each other. In this way, the three-dimensional shaped object can be produced by the manufacturing apparatus.

As shown in FIG. 7, the manufacturing apparatus 110 of the three-dimensional shaped object conventionally has a chamber 111 full of an inert gas for the purpose of preventing an oxidation of the shaped object. Within the chamber 111, the sintering of the powder material, or the melting and subsequent solidification of the powder material is performed. The manufacturing apparatus is equipped with a powder layer former (e.g., a squeegee blade 112) and a base plate 113 within the chamber 111. With the powder layer former, the powder layer 101 is formed through a supply of the powder material. The powder layer 101 and the solidified layer are formed on the base plate 113. Outside the chamber 111, there is a laser-beam irradiator 114. With the laser-beam L emitted from the laser-beam irradiator 114, the predetermined portion of the powder layer 101 is irradiated via a transmission window 115 provided in a ceiling of the chamber 111. As such, the laser-beam L is transmitted through the transmission window 115 into the chamber 111.

PATENT DOCUMENTS (RELATED ART PATENT DOCUMENTS)

PATENT DOCUMENT 1: Japanese Unexamined Patent Application Publication No. 2012-224919

DISCLOSURE OF THE INVENTION

Problems to be Solved by the Invention

Upon the sintering of the powder material or upon the melting and subsequent solidification of the powder material by the irradiation of the powder material 101 with the laser beam L, a smoke-like material called "fume" is generated. That is, the fume is generated from the irradiated portion of the powder material with the light beam L. The generated fume tends to upwardly move, and eventually it adheres to the transmission window 115. This causes the transmission window 115 to have a lower transmissivity with respect to the laser beam L. The lowered transmissivity of the transmission window 115 makes it impossible for the laser beam L to have the desired energy at the material layer 101. As a result, the powder layer 101 cannot undergo a satisfactory solidification upon the irradiation thereof with the laser beam L, which may pose a problem in that the desired shaped object cannot be produced.

In order to solve the above problem, the present invention provides an apparatus for manufacturing a three-dimensional shaped object, the apparatus comprising a chamber, a transmission window, a blow-out port and a cover member, wherein a solidified layer is formed by irradiation of a predetermined, portion of a material layer (which is provided within the chamber) with a light beam, thereby allowing a sintering of the material in the predetermined portion or a melting and subsequent solidification of the material. The transmission window is provided in a ceiling of the chamber, allowing the light beam to be transmitted there through. The blow-out port is located around the transmission window, and serves for blowing out an inert gas toward an interior of the chamber. The cover member, which is positioned below the blow-out port and along the periphery of the transmission window, serves for surrounding the blow-out port. The cover member has an annular form. A gap for allowing the inert gas to pass there through is provided between the cover member and the transmission window.

In accordance with the present invention, the inert gas with which the inside of the cover member is filled allows to be flown out from the gap formed between the cover member and the transmission window. This can prevent the fume from attaching to the transmission window.

Specifically, the cover member allows the inert gas coming from the blow-cut port to once stay at the cover member, which causes the inside of the cover member to be filled with the inert gas. Between the cover member and the transmission window, the gap for allowing the inert gas to pass there through is provided at the side of the inner periphery of the cover member. Thus, the inert gas provided at the inside of the cover member can be blown out through the gap formed between the cover member and the transmission window such that the gas flows toward the interior of the chamber while flowing along the surface of the transmission window. This makes it possible for the surface of the transmission window be covered with the inert gas, which can prevent the fume from attaching to the transmission window. As such, the manufacturing apparatus of the three-dimensional shaped object according to the present invention can prevent the transmissivity of the transmission window from becoming lower with respect to the laser beam, which leads to an achievement of the production of the desired shaped object.

BRIEF DESCRIPTION OF THE DRAWINGS

FIG. 5 is a detailed cross-sectional view partially illustrating a ceiling part of a chamber according to Embodiment 1 of the present invention.

MODES FOR CARRYING OUT THE INVENTION

The apparatus for manufacturing a three-dimensional shaped object according to the present invention comprises a chamber, a transmission window, a blow-out port and a cover member, wherein a solidified layer is formed by irradiation of a predetermined portion of a material layer (which is provided within the chamber) with a light beam, thereby allowing a sintering of the material in the predetermined portion or a melting and subsequent solidification of the material. The chamber has the transmission window at a ceiling thereof, allowing the light beam to be transmitted there through. The blow-out port is located around the transmission window, and serves for blowing out an inert gas toward an interior of the chamber. The cover member is positioned below the blow-out port and along the periphery of the transmission window such that the cover member surrounds the blow-out port, and also has an annular form. A gap through which the inert gas passes is provided between the cover member and the transmission window.

In the manufacturing apparatus of the three-dimensional shaped object, the inert gas fully provided at the inside of the cover member is allowed to be flown out from the gap between the cover member and the transmission window. This leads to a prevention of the fume from attaching to the transmission window.

The gap may be positioned immediately below an outer periphery of the transmission window.

The positioning of the gap immediately below the outer periphery of the transmission window makes it possible for the inert gas to more effectively cover the surface of the transmission window. This can further prevent the fume from adhering to the transmission window.

The cover member may comprise an inner circumference wall and an inner flange, the inner circumference wall being in a cylindrical form. The inner circumference wall may be located to provide the gap with respect to the transmission window. The inner flange may extend inwardly from the inner circumference wall such that the flange is located below the gap.

The inner circumference wall and the inner flange of the cover member can make it difficult for the upwardly moving fume to enter a space surrounded by the inner circumference wall and the inner flange. This can more effectively prevent the fume from adhering to the transmission window.

The opening space (opening area) of the blow-out port may be larger than an opening space (opening area) of the gap.

Such opening spaces of the blow-out port and the gap enables the inert gas to stay at the inside of the cover member with its high pressure. This can further prevent the fume from adhering to the transmission window.

The present invention will now be described according to a certain embodiment, with reference to the accompanying drawings.

(Embodiment 1)

First, a method for manufacturing a three-dimensional shaped object by a manufacturing apparatus of the shaped object will be described in accordance with this embodiment.

Figure 1A:
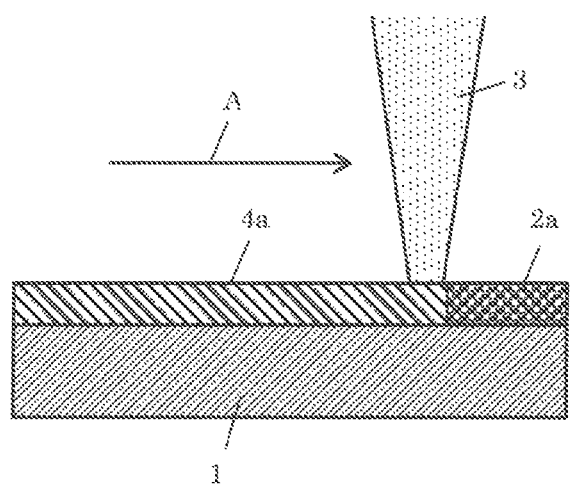
FIG. 1A is a view for explaining a forming of the first layer (1$^{st}$ layer) of a three-dimensional shaped object in a manufacturing apparatus of the shaped object according to Embodiment 1 of the present invention.
Figure 1B:
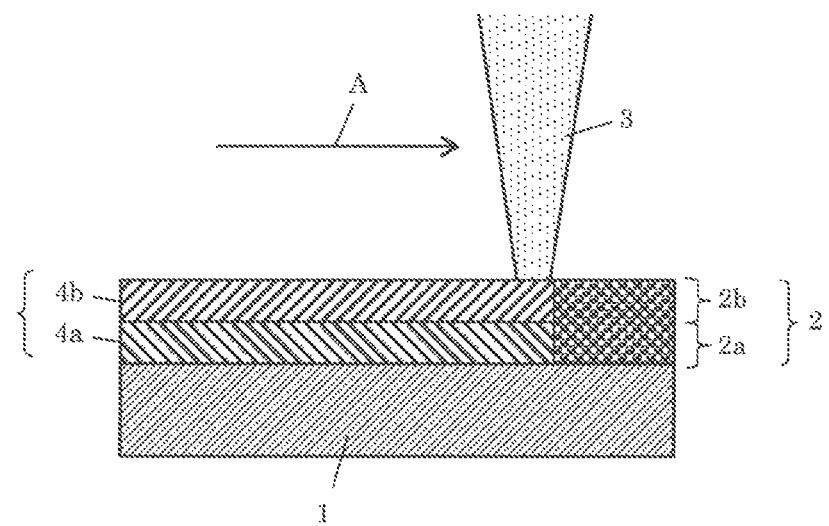
FIG. 1B is a view for explaining a forming of the second layer (2$^{nd}$ layer) of a three-dimensional shaped object in a manufacturing apparatus of the shaped object according to Embodiment 1 of the present invention.

As shown in FIG. 1A, an inorganic or organic powder material is spread onto a base plate 1 (i.e., a plate for the shaped object) to form a powder layer 2a. The powder layer 2a in this embodiment corresponds to one example of the material layer. Subsequently, the predetermined portion of the powder layer 2a is irradiated with a laser beam 3 to allow a sintering of the powder material or a melting and subsequent solidification of the powder material. This enables the powder layer 2a to be solidified, and thereby a solidified layer 4a is formed. The forming of the solidified layer 4a may be performed while keeping the laser beam 3 moving in the direction of "A". Then, as shown in FIG. 1B, a further powder material is spread onto the solidified layer 4a and the remaining portion of the powder layer 2a to newly form a powder layer 2b. Similarly, the predetermined portion of the powder layer 2b (corresponding to one example of the material layer) is irradiated with a laser beam 3 to allow a sintering of the powder material or a melting and subsequent solidification of the powder material. The solidified layer 4b thus newly formed becomes integrated with the solidified layer 4a located there beneath. The repetition of the forming of the solidified layer in the manufacturing apparatus can lead to a provision of a three-dimensional shaped object with a plurality of the solidified layers 4 integrally stacked with each other.

The raw material for the three-dimensional shaped object is not limited to being in a form of powder. For example, an epoxy resin in a liquid form may be used as the raw material for the three-dimensional shaped object. In this case, the epoxy resin charged in a tank (not shown) may be used, instead of the material spreading onto the base plate 1. Such epoxy resin is subjected to a curing process by a laser beam of ultraviolet, for example.

The manufacturing apparatus of a three-dimensional shaped object according to an embodiment of the present invention, which is able to produce the shaped object as described above, will now be described.

Figure 2:
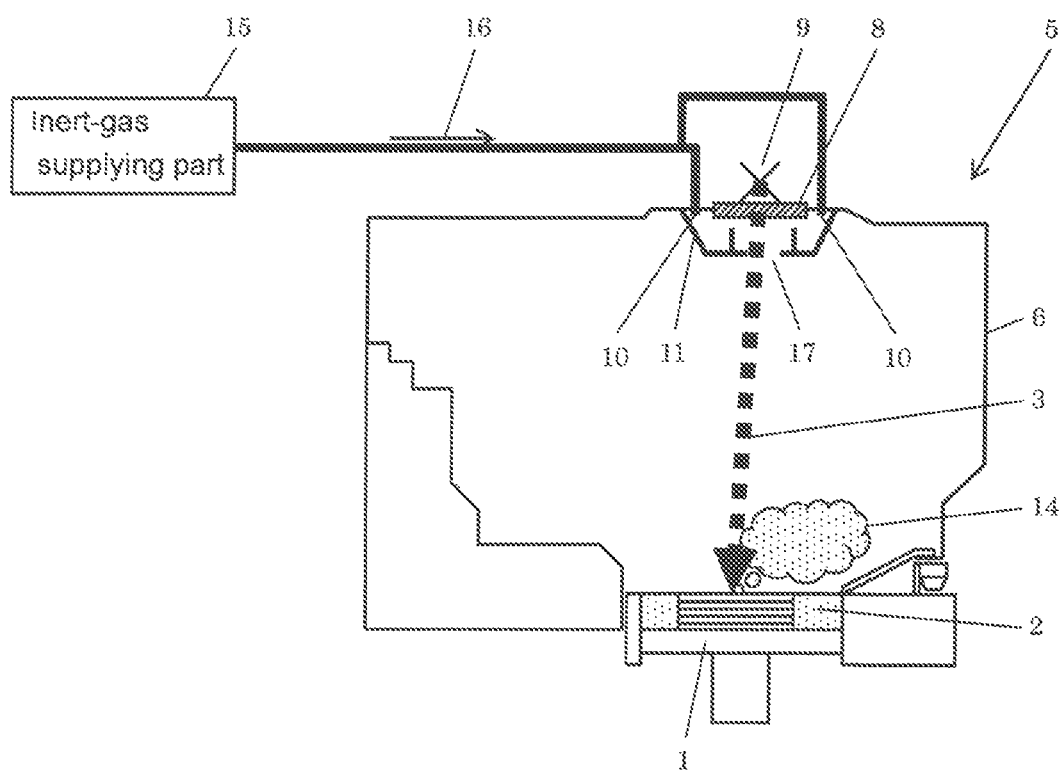
FIG. 2 is a schematic view illustrating the whole of a manufacturing apparatus of a three-dimensional shaped object according to Embodiment 1 of the present invention.

FIG. 2 shows a construction of the manufacturing apparatus 5 of the three-dimensional shaped object according to the embodiment. The manufacturing apparatus 5 comprises chamber 6. The three-dimensional shaped object is manufactured in the interior of the chamber 6. Within the chamber 6, a powder layer former (not shown) is provided for forming the powder layer 2 (corresponding to one example of the material layer). The powder layer former serves to spread a powder material to form the layer with the predetermined thickness. The powder layer former comprises a material supply means for supplying a powder material and a squeegee means for evening the surface of the powder layer 2. The powder layer 2 is formed on a base plate 1 which is also placed within the chamber 6. The base plate 1 is capable of vertically elevating/descending. At the ceiling of the chamber 6, the transmission window 8 for allowing a laser beam 3 (corresponding to one example of the light beam) to pass there through is provided. The material for the transmission window 8 may be any suitable one as long as it permits a transmission of the laser beam 3 there through. Examples of the material for the transmission window include a transparent quartz glass. The transmission window 8 may have a lens function of giving a focal point of the laser beam at the powder layer 2. The manufacturing apparatus 5 is further equipped with a light source 9 for the laser beam 3, the light source being located above the transmission window 8. The blow-out port 10 for blowing out the inert gas toward the interior of the chamber 6 is provided around the transmission window 8. The blow-out ports 10 may be positioned such that they surround the transmission window 8. The blow-out port 10 can be in a form of continuous slit(s) or in a form of a plurality of openings The blow-out port 10 can serve to direct the inert gas to flow downwardly.

Figure 3:
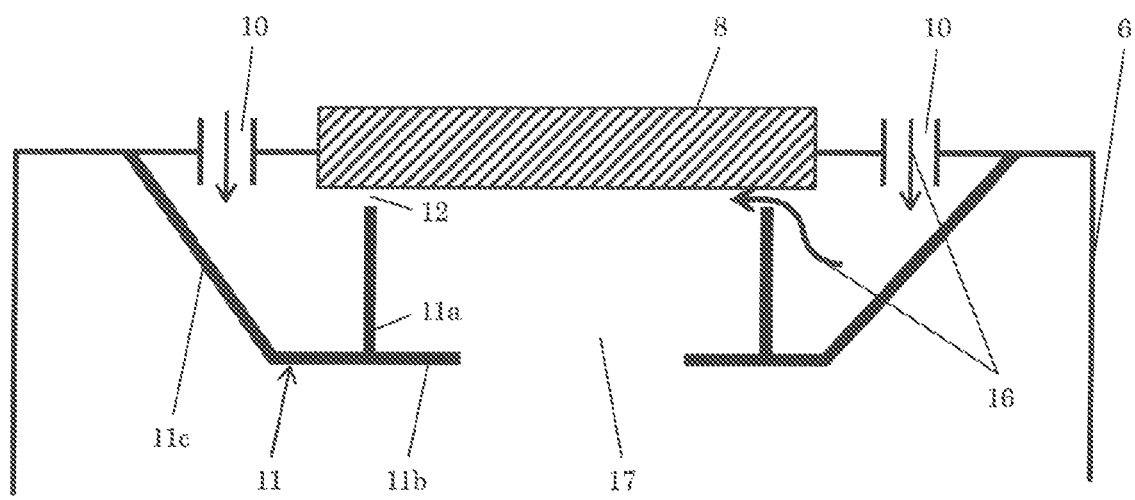
FIG. 3 shows a part of an internal structure of a chamber according to Embodiment 1 of the present invention.
Figure 4A:
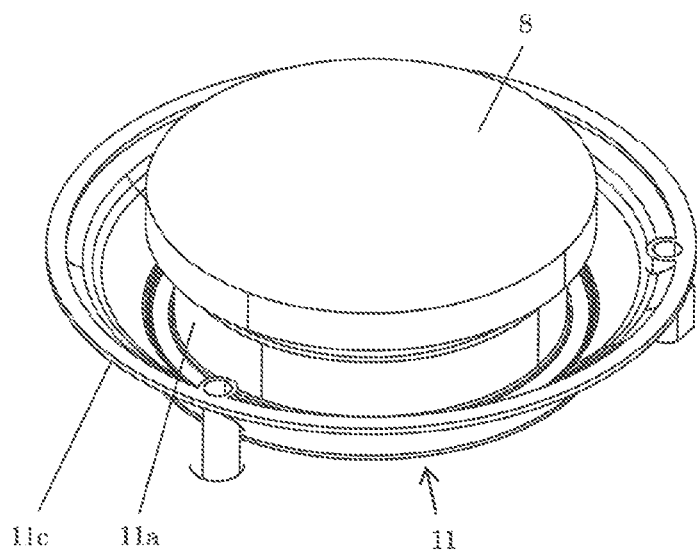
FIG. 4A is a perspective view illustrating a transmission window and a cover member according to Embodiment 1 of the present invention.
Figure 4B:
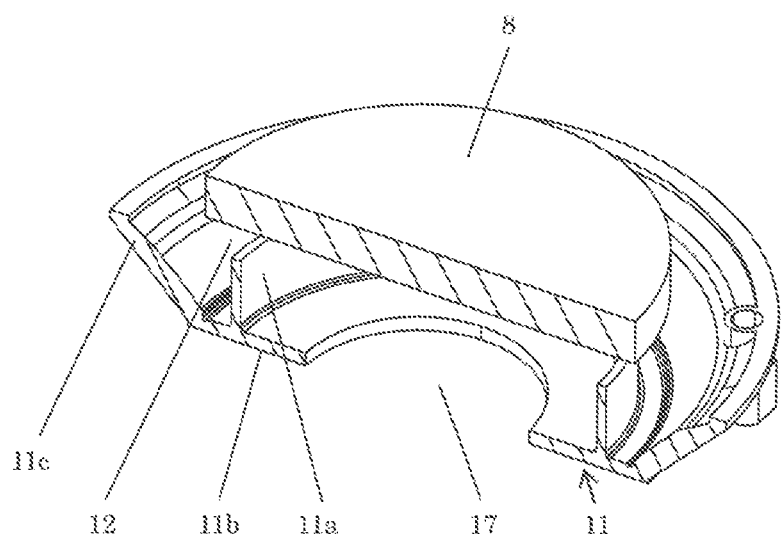
FIG. 4B is a perspective and cross-sectional view illustrating a transmission window and a cover member according to Embodiment 1 of the present invention.
Figure 6:
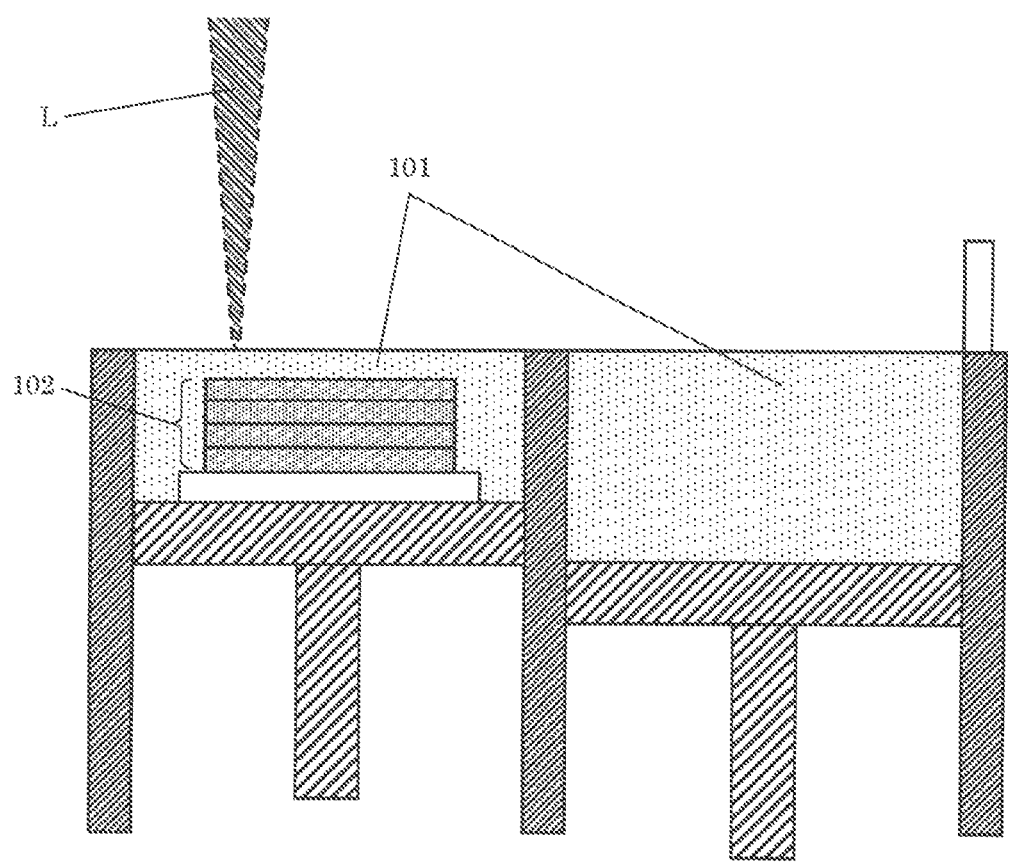
FIG. 6 is a view for explaining a manufacturing method of a three-dimensional shaped object by the conventional manufacturing apparatus of the shaped object.
Figure 7:
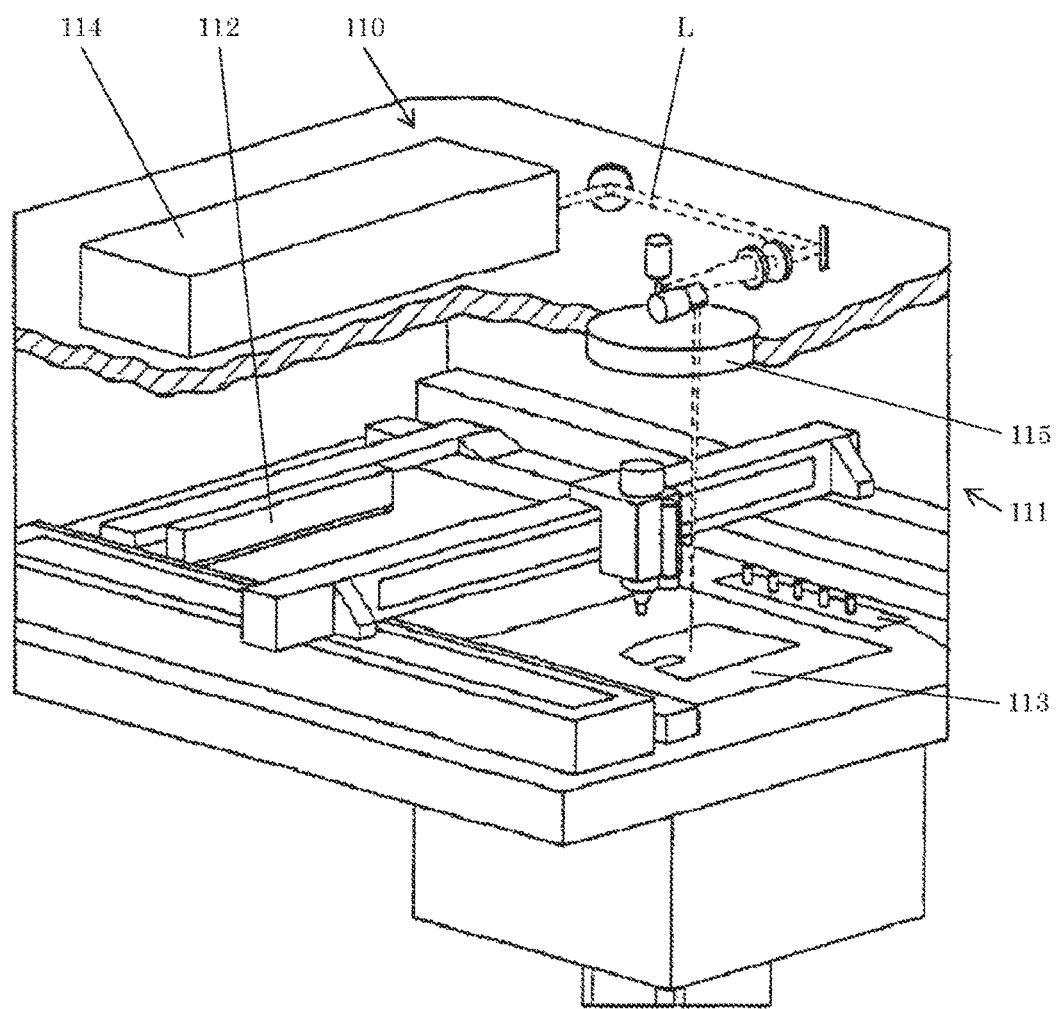
FIG. 7 is a schematic view illustrating the conventional manufacturing apparatus of a three-dimensional shaped object.

Below the blow-out port 10, an annular cover member 11 is provided for surrounding the blow-out port 10. More specifically, the cover member 11 is positioned below the blow-out port and along the periphery of the transmission window 8. As shown in FIGS. 3, 4A and 4B, the cover member 11 comprises an inner circumference wall 11a in a cylindrical form, an inner flange 11b, and an outer circumference wall 11c. The cover member 11 has a circularly annular space which is located around the blow-out ports 10 such that the circularly annular space is in alignment with the posit ion of the blow-out ports 10. The circularly annular space corresponds to a space surrounded by the inner circumference wall 11a and the outer circumference wall 11c. The upper edge of the inner circumference wall 11a is positioned adjacent to the transmission window 8. This means that the gap 12 for allowing the inert gas 16 to pass there through is formed between the transmission window 8 and the upper edge of the inner circumference wall 11a. The cover member 11 is provided such that it encloses the transmission window 8. In this regard, the gap 12 has such an annular form that it is opposed to the cuter periphery of the transmission window 8. As such, the gap 12 according to this embodiment of the present invention is positioned immediately below the outer peripheral portion of the transmission window 8.

The inner circumference wall lie may be in a form of a circular cylinder or a polygonal cylinder. Alternatively, the form of the inner circumference wall 11a may be a part of an upwardly or downwardly tapered circular or polygonal cylinder.

The inner circumference wall 11a is provided with the inner flange 11b which inwardly projects below the upper edge of the inner circumference wall 11a. This means that the inner flange 11b is below the gap 12 such that the inner flange 11b extends inwardly from the inner circumference wall 11a. The inner flange 11b is in a form of a circularly annular and flat plate, and thus the inner flange 11b forms an opening portion 17 at the center of the cover member. The inner circumferential edge of the inner flange 11b is positioned inwardly with respect to the upper edge of the inner circumference wall 11a, i.e., with respect to the gap 12.

The method for manufacturing the three-dimensional shaped object by the manufacturing apparatus having such construction will now be described, with reference to FIGS. 1A, 1B and 2.

First, an inert gas 16 is supplied from an inert-gas supplying part 15 placed outside the chamber 6. The supplied inert gas 16 flows through the blow-out port 10 into the chamber 6. This allows the interior of the chamber 6 to be full of the inert gas 16. The inert gas 16 is an inactive gas with respect to the powder material. As the inert gas 16, a nitrogen gas, an argon gas or a helium gas may be used, for example. The inert-gas supplying part 15 may be a compressed gas cylinder, for example. As described above, the powder layer 2a of the powder material is formed on the base plate 1 by the powder layer former within the chamber 6.

Thereafter, the laser beam 3 is emitted from the light source 9. The emitted laser beam 3 passes through the transmission window 8, and thus the predetermined portion of the powder layer 2a is irradiated with such laser beam. The irradiated powder layer 2a with the laser beam undergoes a sintering of the powder material or a melting and subsequent solidification of the powder material. The laser beam 3 to be used may be any suitable one as long as it has a desired energy for the sintering of the powder layer 2 or for the melting and subsequent solidification of the powder layer 2. Examples of the laser beam 3 include carbon dioxide gas laser, YAG laser, and the like. The manufacturing apparatus 5 according to the embodiment of the present invention may be equipped with a galvanometer scanner (not shown) or the like. This makes it possible for the manufacturing apparatus 5 to perform an exact irradiation with the laser beam 3 at the desired portion of the powder layer 2, which leads to a desired formation of the solidified layer 4.

After the $1^{st}$ solidified layer 4a is formed, the base plate 1 is descended by one-layer thickness in the manufacturing apparatus 5. Subsequently, a new powder material is supplied by the powder layer former to form a new powder layer 2b . The manufacturing apparatus 5 then performs the above process again, and thereby forming a new solidified layer 4b on the solidified layer 4a formed prior thereto. Such repetition of the processes in the manufacturing apparatus 5 leads to a production of the desired shaped object.

When the powder layer 2 is irradiated with the laser beam 3, a smoke-like material called "fume" (e.g., the fume 14 shown in FIG. 2) is generated upon the sintering of the powder material or upon the melting and subsequent solidification of the powder material. The fume 14 can be a metal vapor or a resin vapor, depending on the kind of the powder material to be used. This fume 14 tends to upwardly move toward the upper part of the chamber 6.

With reference to FIGS. 3 and 5, the supplying of the inert gas 16 will now be described in detail.

The inert gas 16, which is supplied from the inert-gas supplying part 15, can reach the blow-out port 10 through a supply line (not shown) Subsequently, the inert gas 16 is forced to he blown out from the blow-out port 10 toward the inside of the cover member 11 located below the port 10. This causes the space surrounded by the inner circumference wall 11a and the outer circumference wall 11c to be filled with the inert gas 16, and thereby allowing the inert gas to be flown out from the gap 12 located between the transmission window 8 and the inner circumference wall 11a of the cover member 11 while being directed toward a space located between the inner circumference wall 11a and the inner flange 11b. As a result, the inert gas 16 can flow along the surface of the transmission window 8 toward the center of the transmission window 8, the surface of the window in this case being one positioned at the side of the interior of the chamber 6. Thereafter, the inert gas 16 can flow to reach the interior of the chamber 6 through the opening portion 17 located at the center of the cover member, the opening portion being formed by the inner flange 11b. As such, the inert gas 16 can flow along the surface of the transmission window 8 such that the surface of the window is surrounded by the flowing gas, inhibiting the upwardly moving fume 14 from adhering to the transmission window 8.

It is preferred that an opening space of the blow-out port 10 is larger than an opening space of the gap 12. The reason for this is that the inside of the cover member 11 is promoted to be filled with the inert gas 16 while a high pressure of the gas is given. This facilitates the gas coming from the gap 12 to flow along the surface of the transmission window 8 so that the surface is surrounded by the flowing gas. As a result, the upwardly moving fume 14 from the lower part of the chamber is prevented from adhering to the transmission window 8.

The space surrounded by the inner circumference wall 11e and the inner flange 11b is full of the inert gas 16. This causes the inert gas 16 to downwardly flow from the opening portion 17 formed by the inner flange 11b, and thereby inhibiting the fume 14 from entering the space surrounded by the inner circumference wall 11a and the inner flange 11b. Moreover, the inner circumferential edge of the inner flange 11b is positioned inwardly with respect to the position of the gap 12. Such inward positioning of the inner circumferential edge allows the inert gas 16 above the inner flange 11b to flow from the inner circumference wall 11a toward the opening portion 17 (see the flow "13"). This flow 13 of the inert gas can inhibit the fume having reached the vicinity of the opening portion 17 from entering the space surrounded by the inner circumference wall 11a and the inner flange 11b. In this regard, the space surrounded by the inner circumference wail 11a and the inner flange 11b has a higher pressure condition than that of the interior of the chamber 6, which also makes it difficult for the fume 14 to reach the transmission window 8. This means that the fume 14 can be inhibited from entering the upper side of opening portion 17.

It is desired that the central opening portion 17 formed by the inner flange 11b has a small size for keeping the fume 14 off the transmission window 8. While on the other hand, it is needed that the central opening portion 17 formed by the inner flange 11b has such an adequate size that the irradiation of the powder layer 2 with the laser beam 3 is not adversely inhibited.

The manufacturing apparatus 5, which can keep the fume 14 off the transmission window 8 as described above, makes it possible for the transmissivity of the transmission window 8 to be kept high over a long period of time. This means that the manufacturing apparatus 5 can produce the shaped object with a higher degree of accuracy, while prolonging the time for continuous run of the manufacturing, which leads to a suitable production of the large shaped object or the shaped object with its complicated contour shape.

INDUSTRIAL APPLICABILITY

With the manufacturing apparatus according to the present invention, a contamination of the light transmission window is prevented, and thereby allowing a suitable continuous run of the manufacturing of the three-dimensional shaped obj ect to be provided. This is beneficial for the manufacturing of the large shaped object or the shaped object with its complicated contour shape.

EXPLANATION OF REFERENCE NUMERALS

1 Base plate
2 Powder layer (Material layer)
3 Laser beam (Light beam)
4 Solidified layer
5 Manufacturing apparatus (Apparatus for manufacturing three-dimensional shaped object)
6 Chamber
8 Transmission window
9 Source of light
10 Blow-out port
11 Cover member/Cover
11a Inner circumference wall
11b Inner flange
11c Outer circumference wall
12 Gap
13 Flow
14 Fume
15 Supplying part of inert gas
16 Inert gas
17 Opening portion

The invention claimed is:

1. An apparatus for manufacturing a three-dimensional shaped object wherein a solidified layer is formed by irradiation of a predetermined portion of a material layer with a light beam, thereby allowing a sintering of the material in the predetermined portion or a melting and subsequent solidification of the material, the material layer being within a chamber, the apparatus comprising:
   the chamber;
   a transmission window through which the light beam is allowed to be transmitted, the window being provided in a ceiling of the chamber;
   a blow-out port for blowing out an inert gas toward an interior of the chamber, the port being located around the transmission window; and
   an annular cover member for surrounding the blow-out port, the cover member being positioned below the blow-out port and around the transmission window,
   the cover member comprising:
      a cylindrical inner circumference wall, and
      an inner flange located below a gap, wherein the inner flange extends
      inwardly from the cylindrical inner circumference wall; and
   wherein the gap, through which the inert gas is allowed to pass, is provided between an upper end portion of the cylindrical inner circumference wall and the transmission window at a position immediately below an outer periphery of the transmission window.

2. The manufacturing apparatus according to claim 1, wherein an opening space of the blow-out port is larger than an opening space of the gap.

\* \* \* \* \*